United States Patent [19]

Friefeld et al.

[11] 4,200,148
[45] Apr. 29, 1980

[54] STORING AND EXTRACTING LATENT HEAT

[75] Inventors: Jerome M. Friefeld, Agoura; Jacob Silverman, Woodland Hills, both of Calif.

[73] Assignee: Rockwell International Corporation, El Segundo, Calif.

[21] Appl. No.: 892,723

[22] Filed: Apr. 3, 1978

[51] Int. Cl.² ............................................. F28D 21/00
[52] U.S. Cl. ................................. 165/104 S; 126/436; 60/641; 60/659
[58] Field of Search ......................... 165/104 S, 154; 126/400, 436; 60/659, 641

[56] References Cited

U.S. PATENT DOCUMENTS

| | | | |
|---|---|---|---|
| 2,911,513 | 11/1959 | MacCracken | 165/104 S X |
| 3,996,919 | 12/1976 | Hepp | 165/104 S X |
| 4,131,158 | 12/1978 | Abhat | 165/104 S |

FOREIGN PATENT DOCUMENTS 2602530  5/1977  Fed. Rep. of Germany ....... 165/104 S Primary Examiner—Albert W. Davis
Attorney, Agent, or Firm—L. Lee Humphries; Robert M. Sperry

[57] ABSTRACT

Heat is stored by melting a mixture of salts contained in compartments between an inner and an outer tube and radial copper fins which taper in radial outward direction. The molten salts solidify upon passage of relatively cold water through the inner tube, but formation of salt deposits on the fins is deferred so that liquid salt interfaces directly with the fins for an extended period of time during heat extraction.

1 Claim, 3 Drawing Figures

STORING AND EXTRACTING LATENT HEAT

BACKGROUND OF THE INVENTION

The present invention relates to the storage and extraction of thermal energy on the basis of the latent heat of fusion of a storage medium.

Heat of fusion has been used successfully for buffering thermal energy as between a prime source of heat and a user, operating on an asynchronous basis in the sense that periods of development of heat do not or at least not completely coincide with periods of desired and required use. A typical example here is solar energy, the sun being the prime source and the user being, e.g. an electrical power plant. Obviously night time energy demands can be satisfied only through a buffer which must be filled in the daytime. Correspondingly, not all of the solar energy being collected could or should be used right away.

The thermal buffering as described requires employment of a heat storage medium. For example, salt mixtures are currently used to store thermal energy in the form of the latent heat of fusion of the mixture; that is to say large quantities of such a mixture are gradually melted by a heating process deriving its energy e.g. from a solar radiation concentrating system. If properly insulated, the molten salt retains the stored energy until a colder fluid is brought into heat exchange relation with the molten salt which will gradually solidify while heating the colder heat exchange fluid. Salts are used with advantage here, because the phase change temperature (i.e. the melting point) can be chosen and adapted to a high value so that one may generate steam, possibly even superheated steam at a sufficiently high temperature, which, however, is limited by the phase change temperature. Moreover, the latent heat of fusion should be rather high to obtain a rather high storage capacity on a caloric or watt-hour per unit volume basis.

The known heat exchange devices for such a system employ, for example, a storage tank and separate coils for the heat exchange fluids to be used for supplying heat to the tank and for extracting heat therefrom. It was found that formation of solid salts at and around the heat extraction coils significantly impedes the heat transfer from the still liquid state, particularly after a rather thick build-up in solid salt deposits on the heat extractor coils. One could (and, actually must) remove the salt deposits by, for example, a scraping mechanism, or the like. Without more or less continuous removal of the salt deposits heat transfer conditions change drastically throughout the heat extraction process amounting in effect in a significant drop in temperature of the heat extracting fluid. Such salt removal procedure is cumbersome and complicates the construction. Moreover, it seems rather undesirable to operate the heat buffer, being basically a passive device, under utilization of moving parts.

SUMMARY OF THE INVENTION

In accordance with the preferred embodiment of the present invention, it is suggested to construct a thermal buffer in a tubular configuration being comprised of a concentric tube system of which the inner tube serves as conduit for the heating fluid as well as for the heat extraction fluid. The space between the tubes is compartmentalized by longitudinal (axial) fins extending radially from the inner tube or by radial fins, being made of a very good thermal conductor, and preferably, tapering in radial outer direction. The compartments between the fins and the inner and outer tubes contain the phase change medium e.g. salt or mixture of salts.

It was found that in such an arrangement heat extraction is not impeded by an early build-up of solid salt deposits on the inner tube; a considerable portion of the fins' surface remains directly exposed to the liquid phase and even later in the heat extraction operation, the surface deposit on the radial outer fin portions remain considerably thinner than the deposit on the inner tube.

OBJECTS OF THE INVENTION

It is an object of the present invention to improve the efficiency of heat extraction from a thermal buffer operating on the basis of a phase change of a storage medium.

It is a particular object of the present invention to improve the operation of thermal buffers using the latent heat of fusion, by avoiding the need for removing solidified deposits from heat exchanger parts.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DESCRIPTION OF THE PREFERRED EMBODIMENTS

Figure 1:
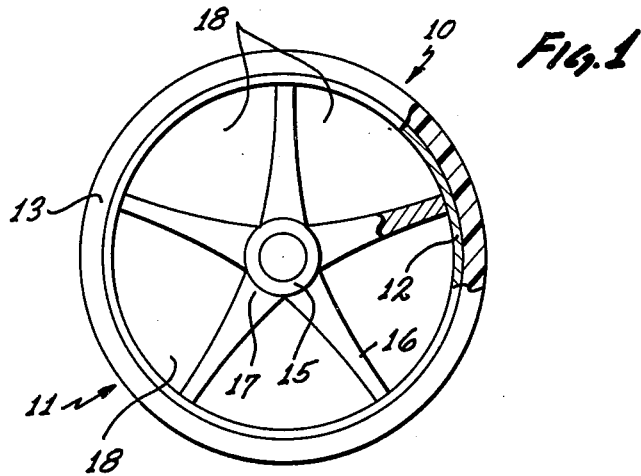
FIG. 1 is a cross-section through a storage module in accordance with the preferred embodiment.
Figure 2:
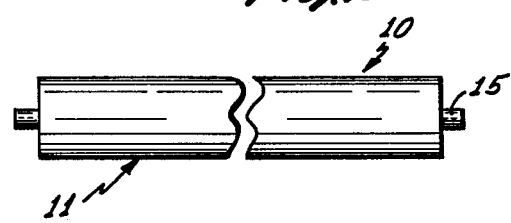
FIG. 2 is a side view of such module.

Proceeding now to the detailed description of the preferred embodiments, the figures show a thermal storage module 10 which is comprised of an outer tube 11 being constructed to provide for adequate heat insulation against the environment. The tube or pipe 11 may include a tubular, core portion made of a suitable construction material (e.g. stainless steel) 12 being jacketed by thermally insulating layers, 13 and/or a circumscribing tubing exhibiting minimal radial heat transfer. A suitable jacket may consist of fiberglass foam or the like.

An inner tube 15 is coaxial with outer tube 11. In its preferred configuration, inner tube 15 is made from a high-strength, corrosion-resistant material having good heat transfer properties such as stainless steel. The heat exchange fluids pass through tube 15 for both, heat storage and heat extraction. Tubes 11 and 15 are connected and held in constant relation by a plurality of fins 16 each extending radially and longitudinally and each having a rather broad base portion 17. Broad base 17 provides the point of contact for welding or brazing each fin 16 to tube 15.

Each fin 16 has a tapered cross-section, the side walls being preferably parabolically curved. While the fins 16 are designed for optimum thermodynamic properties they serve also as spacers to hold the inner tube 15 concentric with outer tube 11. Since the primary function of fins 16 is thermodynamic, the fins 16 are preferably made of copper or a copper alloy or a comparably good heat conductor.

Compartments 18 have forward and aft ends and are bounded by the fins 16 and tubes 11 and 15. Each compartment 18 is filled with a salt mixture such as one comprising about 95% NaNO$_3$; 1% NaOH and one more of the following: NaF; Na$_2$SO$_4$; NaCl; NaC$_2$O$_3$, all percentages by weight. The melting point of such a mixture is about 300° C. with a heat of fusion of about 10$^2$ KWhr per cubic meter.

The aforementioned concentric tube system comprises the storage module 10. It may be used in conjunction with other storage modules 10 to create a thermal storage system. The individual module may range 5' to 20' in length. The upper limit has been primarily determined by the need for handling of the concentric tube system during transport and installation. The outer tube 11 may be almost any size, but an outer diameter not exceeding about a foot is preferred. The preferred diameter for inner tube 15 may be about one inch; however, the specific diameter may be determined by standard thermodynamic analysis of specific design parameters.

Figure 3:
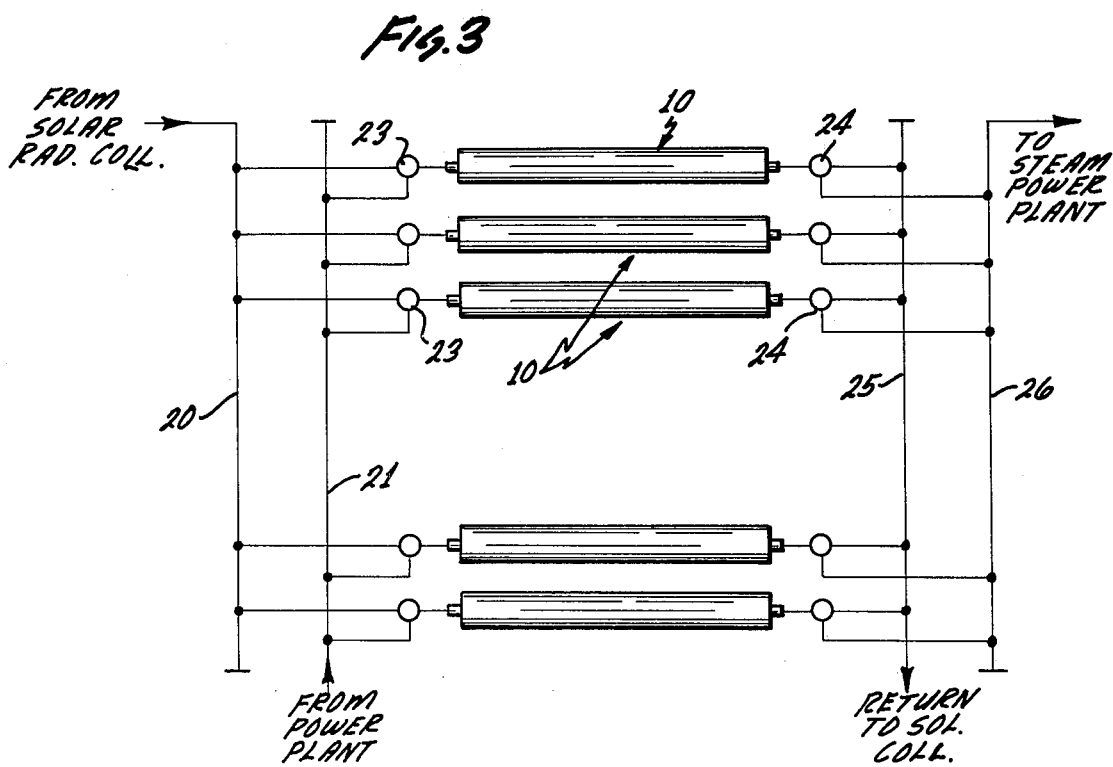
FIG. 3 is a schematic view of a system using plural such modules.

It is important to note that the inner tube 15 serves as conduit for heating fluid as well as for heat extraction fluid. Accordingly, module 10 is connected to separate manifolds for separate feeding and separate discharge of the heating and heat extraction fluids. FIG. 3 illustrates the system aspect showing a plurality of such modules 10. Two manifolds 20 and 21 are provided respectively for feeding e.g. hot and cold water to the inner tubes 15 of the modules 10. The hot water manifold 20 connects to a solar radiation collector; the cold water manifold 21 constitutes the return flow from a steam power plant. Each module 10 is connected to one or the other of the two manifolds by means of one of the valves 23.

Discharge of the module 10 is effected through valves 24 which connect the storage modules 10 to manifold 25 or manifold 26. Manifold 26 leads to the steam power plant, while manifold 25 returns originally hot but now cooled heating fluid to the solar radiation collector. Each module 10, therefore may be inserted in one of two circulations or flow circuits, one circuit includes the solar heater, the other circuit includes the steam power plant. A module 10 may, however, be disconnected from either circuit e.g. for just storing energy, or for being kept on a standby basis.

In operation, one may initially assume that the salt within a module is entirely solid. As a heating fluid, such as water having a temperature of about 100° F. above the melting point of the salt mixture, passes through the inner tube 15 of module 10, the salt in compartments 18 will begin to melt. The fins 16 assist in the melting process by carrying the heat to the more remote areas of each compartment thereby melting the salt from three sides. Likewise, fins 16 are of major importance during heat extraction.

Heat is extracted from storage module 10 by forcing water which is about 100° F. below the melting point of the salt through tube 15. As the salt cools, it will begin to solidify, and deposits will form rather quickly around tube 15. The outside surface of tube 15 will rapidly reach equilibrium with the melting point temperature of the salt creating a strong thermal gradient across the wall of tube 15. The freed latent heat of fusion is then conveyed to the water in the tube converting it to saturated steam. The temperature of the steam leaving module 10 will approximate the temperature of the melting point of the salts obviously dictating the need for pressure vessels.

The thermodynamic properties of fins 16 are somewhat distinct from those for tube 15. It should be readily apparent that a radial temperature gradient exists through the fins 16 causing the latent heat of fusion developed at the solid/liquid interface in the chambers to migrate through the liquid to the radial end portions of the fins 16. The temperature of the fins 16 increases radially and can be expected to remain above the phase change temperature for extended period of time. Thus, since the fin is at the phase change temperature the surface of the fins 16 will remain exposed to the liquid salt for long periods of time. It should be noted that a deposit of solidified salt will grow radially from tube 15 while concurrently growing on and along the fins. Although the solidified salt layer will eventually grow along fins 16, the fins 16 will remain in contact with liquid salt for extended periods. This permits the thermal energy path between the liquid salt and the copper fins to remain viable and therein inhibit the growth of the thick salt deposit.

Thus, it can be seen that the invention is not the enlargement of the heat exchange surface of tube 15; rather the fins in accordance with the invention make sure that the period of desired heat exchange contact between the liquid phase and the fin material is extended well beyond the formation of the ever increasing solid deposit on the tube 15. It is for this reason that one does not have to scrape the deposits off. It can also be seen that in each of the compartments a circulatory flow of liquidous salt is set up. That flow has an outward radial component along one side of each fin. This convective flow is further instrumental in removing freed heat from the internal/liquid interface and transporting it directly to portions of the fins still directly exposed to the liquid to take advantage of the good heat transfer properties of the copper fins. Moreover, this convective flow impedes the formation of salt deposits on that particular fin surface for retaining an interface between the liquid phase and the fin. It can readily be seen that this particular surface of the fin along which liquid salt flows in radial outward direction, will be covered with a relatively thin salt deposit only well into the heat extraction period. Thus, the fins introduce a local asymmetry into the heat exchange process throughout the period of heat extraction. This is instrumental in retaining good heat transfer conditions and tends to equalize the temperature of the water as it leaves the module until the salt has essentially completely solidified.

The invention is not limited to the embodiments described above but all changes and modifications thereof not constituting departures from the spirit and scope of the invention are intended to be included.

What is claimed and desired to be protected by letters patent of the United States is:

1. A thermal energy storage and extraction system, which comprises:
   an inner tube for conveying a heating and a heat extracting fluid;
   a plurality of fins tapering in a radially outer direction wherein each of said fins is radially and longitudinally disposed along said inner tube;
   an outer tube concentric with said inner tube and connected to said inner tube through said fins;
   a plurality of compartments defined by forward and aft closures, by said inner tube and said outer tube on its radial extremities, and by said adjacent fins on its sides; and
   a thermal storage medium located within said compartments.

* * * * *